United States Patent

King et al.

Patent Number: 5,554,241
Date of Patent: Sep. 10, 1996

[54] APPARATUS AND METHOD FOR RETREADING A TIRE

[75] Inventors: Michael J. King, Concord; Robert A. Flynn, San Francisco; Henry Torrez, San Leandro, all of Calif.

[73] Assignee: Oliver Rubber Company, Oakland, Calif.

[21] Appl. No.: 311,581

[22] Filed: Sep. 22, 1994

Related U.S. Application Data

[60] Division of Ser. No. 45,914, Apr. 12, 1993, Pat. No. 5,354,406, which is a continuation-in-part of Ser. No. 908,228, Jul. 2, 1992, abandoned.

[51] Int. Cl.$^6$ .................................................. B29C 73/00
[52] U.S. Cl. ............................................. 156/96; 156/95
[58] Field of Search .................................. 156/64, 95, 96, 156/126, 128.1, 358, 421.6; 425/19, 20, 25, 32, 35, 38, 47, 185, 186; 29/428; 157/14, 16, 17, 18

[56] References Cited

U.S. PATENT DOCUMENTS

| | | | |
|---|---|---|---|
| 1,179,898 | 4/1916 | Coffey et al. | |
| 1,600,586 | 9/1926 | Hatfield | 425/46 |
| 2,030,861 | 2/1936 | Fisher. | |
| 2,094,511 | 9/1937 | Welch | 425/20 |
| 2,128,417 | 8/1938 | Kerr | 156/358 |
| 2,155,906 | 4/1939 | Rihn. | |
| 2,390,293 | 12/1945 | Colson. | |
| 2,567,985 | 9/1951 | Baker et al. | |
| 2,840,857 | 7/1958 | Lett | 425/20 |
| 2,985,917 | 5/1961 | Sunday | 425/47 |
| 3,170,195 | 2/1965 | Knox | 13/45 |
| 3,429,005 | 2/1969 | MacMillan | 425/47 |
| 3,460,197 | 8/1969 | Cantarutti et al. | |
| 3,479,693 | 11/1969 | Cantarutti. | |
| 3,770,032 | 11/1973 | Stull | 157/16 |
| 3,850,555 | 11/1974 | Pasch. | |
| 3,852,006 | 12/1974 | Irie. | |
| 3,976,532 | 8/1976 | Barefoot. | |
| 3,983,193 | 9/1976 | Wulker et al. | 425/24 |
| 3,990,821 | 11/1976 | MacMillan. | |
| 3,994,653 | 11/1976 | Marangoni. | |

(List continued on next page.)

FOREIGN PATENT DOCUMENTS

| | | |
|---|---|---|
| 431872 | 3/1990 | European Pat. Off. |
| 405350 | 6/1990 | European Pat. Off. |
| 1134825 | 7/1961 | Germany. |
| 1169652 | 5/1964 | Germany. |

OTHER PUBLICATIONS

European Search Report dated Sep. 24, 1993, European Patent Application No.93250055.
U.S. Patent Application No. 08/478,006 filed Jun. 7, 1995 entitled *Expandable Tread Mold and Method for Retreading Tires.*
U.S. Patent Application No. 08/475,570 filed Jun. 7, 1995 entitled *Enhanced Tread Mold Expander.*
"Specification QUIK–SEAL IV®" brochure from The Oliver Group.
"PNEUFLEX® New tire appearance. Retread cost." brochure from The Oliver Group (Apr., 1994).
European Search Report Dated Jun. 20, 1995, Application No. 93916764.9–2307–PCT/US93/06076.

*Primary Examiner*—Michael W. Ball
*Assistant Examiner*—Richard Crispino
*Attorney, Agent, or Firm*—Baker & Botts, L.L.P.

[57] ABSTRACT

Tire recapping or retreading apparatus and method including the use of a tread mold with a plurality of mold segments. A tread mold loading machine is used to position the prepared tire carcass relative to the mold segments and to install the mold segments on the exterior of the tire carcass. The mold segments are retained in place on the exterior of the tire carcass by a tension band. Resilient elastic tension bands or pre-stressed metal tension springs hold the mold segments on the tire carcass after the mold segments have been released from the tread mold loading machine. The use of the tread mold loading machine and the mold segments eliminates distortion of the tire carcass during installation of the tread mold.

8 Claims, 6 Drawing Sheets

U.S. PATENT DOCUMENTS

| | | | |
|---|---|---|---|
| 3,999,907 | 12/1976 | Pappas . | |
| 4,036,677 | 7/1977 | Marangoni . | |
| 4,086,047 | 4/1978 | Johnsen | 425/47 |
| 4,088,521 | 5/1978 | Neal . | |
| 4,129,406 | 12/1978 | Capecchi . | |
| 4,185,056 | 1/1980 | Detwiler | 264/36 |
| 4,252,358 | 2/1981 | Klebs . | |
| 4,309,234 | 1/1982 | Witherspoon . | |
| 4,328,053 | 5/1982 | Medlin, Jr. | 156/96 |
| 4,401,502 | 8/1983 | Schmidt . | |
| 4,588,460 | 5/1986 | Magee et al. . | |
| 4,767,480 | 8/1988 | Goldstein . | |
| 4,781,233 | 11/1988 | Williams | 157/16 |
| 4,792,379 | 12/1988 | Magee et al. . | |
| 4,808,898 | 2/1989 | Pearson . | |
| 4,812,281 | 3/1989 | Beard et al. | 264/502 |
| 4,874,194 | 10/1989 | Borcea et al. . | |
| 4,946,554 | 8/1990 | Magee et al. . | |
| 4,957,574 | 9/1990 | Clayton et al. . | |
| 4,963,221 | 10/1990 | Isobe et al. | 156/358 |
| 5,306,130 | 4/1994 | King et al. . | |
| 5,342,462 | 8/1994 | King et al. . | |
| 5,354,406 | 10/1994 | King et al. . | |

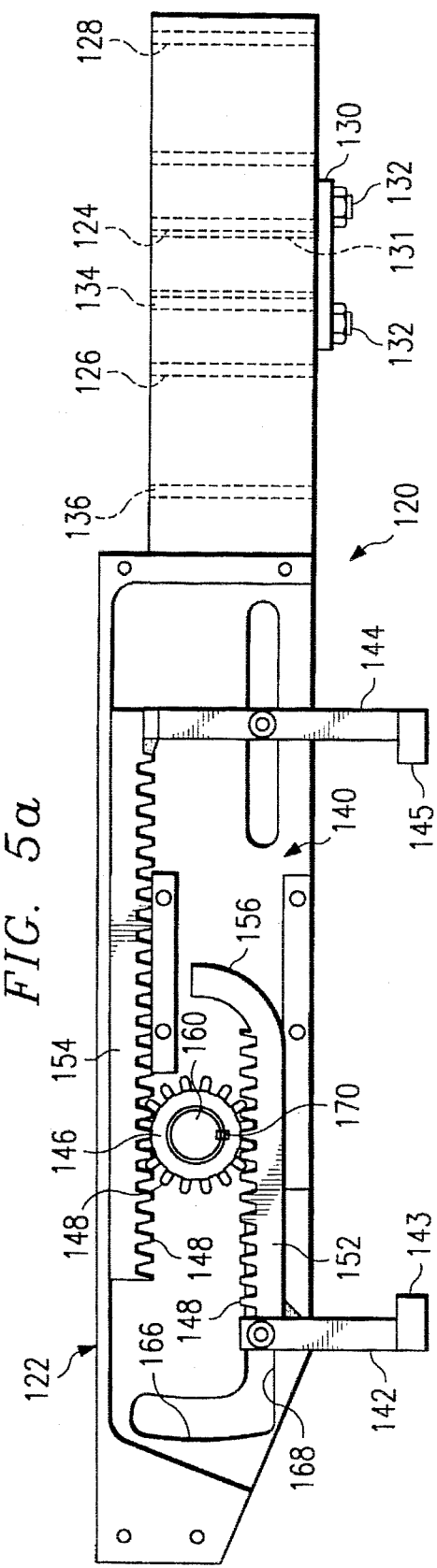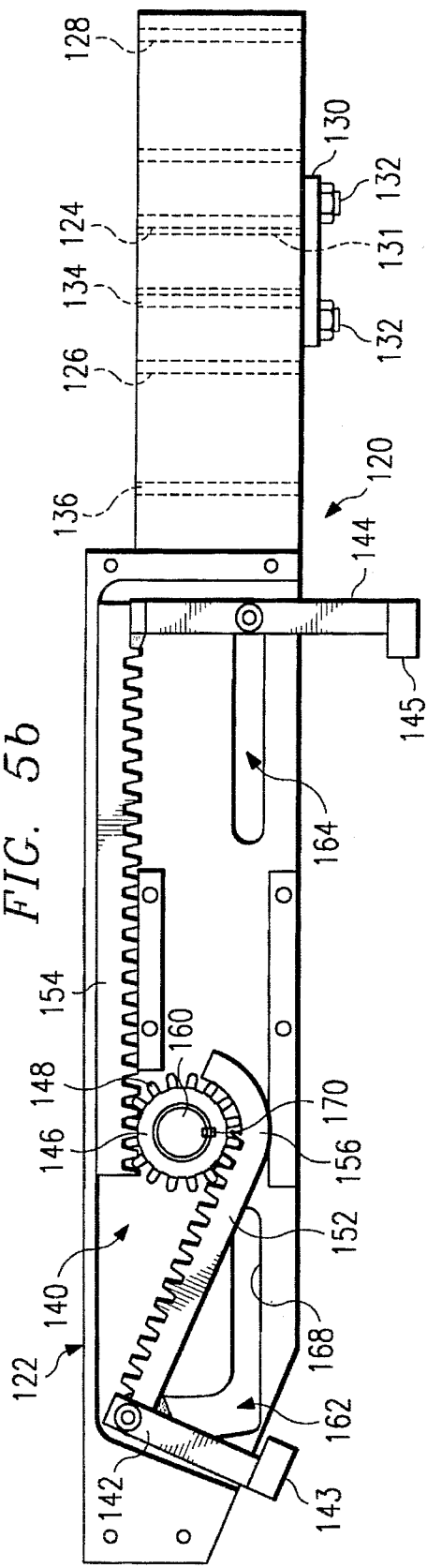

APPARATUS AND METHOD FOR RETREADING A TIRE

This application is a divisional application of U.S. Pat. No. 5,354,406, dated Oct. 11, 1994, entitled *Apparatus for Retreading a Tire*, which is a continuation-in-part of application Ser. No. 07/908,228, filed Jul. 2, 1992, abandoned; and related to patent application Ser. No. 08/475,570, filed Jun. 7, 1995, entitled *Enhanced Treat Mold Expander*, and patent application Ser. No. 08/478,006, filed Jun. 7, 1995, entitled *Expandable Tread Mold and Method for Retreading Tires*.

TECHNICAL FIELD OF THE INVENTION

This invention relates generally to methods and apparatus for retreading a tire casing. More particularly, but not by way of limitation, this invention relates to a tread mold loading machine used to install a plurality of mold segments on retreading material on the exterior of the tire casing.

BACKGROUND OF THE INVENTION

A wide variety of procedures and different types of equipment are available for use in recapping or retreading pneumatic tires. One of the first steps in retreading a worn tire is to remove existing tread material from the tire carcass by buffing. Various procedures are available to apply one or more layers of uncured rubber or retreading material with appropriate bonding agents to the buffed tire carcass. The uncured rubber may also be stitched to the buffed carcass as required. For purposes of this patent application, the term "casing" is used to refer to a buffed tire carcass which has been built up with one or more layers of uncured rubber and other material as required by the retreading equipment and procedures being used to rebuild the worn tire.

In the past, heavy duty mechanical and/or hydraulic closing devices have often been used to install molds which form a new tread in retreading material on a prepared tire carcass or casing. Tire distortion sometimes occurs as the tread molds are closed on the casing. This problem is particularly common if the casing is slightly larger in diameter than desired. In such cases, the prepared tire carcass will often buckle and can thus no longer be used. Damage to a casing during mold installation represents a substantial loss of time and material spent preparing the tire carcass for mold installation.

One method of recapping or retreading tires is illustrated in U.S. Pat. No. 4,767,480, issued Aug. 30, 1988 to Leon C. Goldstein. This patent describes apparatus and methods for retreading which uses a cold process. In this process, a flexible tread mold is stretched over the tire carcass. Subsequently, an envelope is placed over the mold and prepared tire carcass and the entire unit or assembly is placed in a chamber where curing of the rubber is accomplished by inflation of the tire carcass, evacuation of the envelope and pressurization of the chamber and the application of heat.

U.S. Pat. No. 4,588,460, issued May 13, 1986 to Arthur W. McGee, et al. illustrates another method and apparatus for retreading a tire that includes a relatively flexible mold which is formed by a plurality of mold segments. The ends of adjacent mold segments include guides so that the mold, when closed, will form a circle about the casing which will be retreaded. In this process, an elastic band encircles the mold segments for the purpose of holding the mold in position on the tire during handling such as when an envelope is placed over the tire which is ultimately pressurized to force the mold segments into the uncured retread material encircling the tire.

Pneumatic tires may also be recapped or retreaded by installing a continuous replacement tread on a prepared tire carcass. Both uncured and cured or vulcanized rubber compounds have previously been used to provide the continuous replacement tread. Examples of equipment and procedures used to install continuous replacement treads on a tire casing are shown in U.S. Pat. No. 3,976,532 to C. K. Barefoot; U.S. Pat. No. 4,088,521 to P. H. Neal; U.S. Pat. No. 4,036,677 to Carlo Marangouri; and U.S. Pat. No. 4,957,574 to A. R. Clayton, et al.

Most retreading procedures also require the use of a flexible envelope to seal around the tire casing, retread material and tread mold (if used). The complete assembly, including the tire casing, retread material, tread mold (if used) and envelope, are placed in a high pressure, high temperature chamber in preparation for curing the components which comprise the completed tire assembly. The high pressure, high temperature chamber is frequently referred to as an autoclave. Examples of a tire retreading envelope and high pressure, high temperature curing chamber are shown in U.S. Pat. No. 4,309,234 to P. L. Witherspoon. As noted above, U.S. Pat. No. 4,767,480 also contains information on the use of envelopes to assist with curing retreaded tires.

The above listed patents are incorporated by reference for all purposes within this application.

SUMMARY OF THE INVENTION

In accordance with the present invention, the disadvantages and problems associated with previous methods and apparatus for retreading tires including installing tread mold segments on the exterior of tire casings have been substantially reduced or eliminated.

One object of this invention is to provide methods and apparatus for retreading pneumatic tires which eliminate the need for high pressure mold closing equipment. The present invention includes a tread mold loading machine which can install tread molds on a wide range of tire sizes with significant variations in critical tire dimensions without damage to the tire casing. The resulting retreaded tire assembly can be cured in existing hot air chambers.

Another object of the present invention is to provide a method and apparatus for retreading tires that avoids deforming the tire carcass when tread mold segments are placed thereon and thus reduces tire loss during the retreading operation. The present invention allows the use of an adjustable tread mold having a plurality of mold segments which will accommodate variations in casing dimensions. Also, mold segments with a wide variety of different tread designs may be used with the present invention.

The present invention provides, in one aspect, apparatus for retreading a prepared tire carcass or casing having a layer of retreading material located around the exterior thereof. The tread mold loading apparatus or machine includes a plurality of mold segments arranged to be located around the layer of retreading material. The mold segments also include resilient retainers which encircle the tread mold urging the mold segments toward the casing while preparing the tire assembly for curing.

One technical advantage of the present invention is to provide a tread mold loading machine which includes an expandable hub attached to a longitudinal shaft or main axle which may be used to position a prepared tire carcass for installation of tread mold segments. The main axle of the thread mold loading machine allows both longitudinal movement and rotational movement of the prepared tire carcass while mounted on the expandable hub.

Another technical advantage of the present invention includes a plurality of mold segment supporting arms which may be moved inwardly and outwardly with respect to a tire casing to allow installation of a tread mold on the exterior of the tire casing. Each tread mold supporting arm includes a clamp which may be easily engaged and disengaged from the associated mold segment to allow removal of the tire casing and the installed tread mold from the thread mold loading machine. An additional technical advantage of the present invention is that the clamp includes a pair of fingers which are moved by an associated rack and pinion gear. At least one of the fingers can be moved both longitudinally and radially by its associated rack and the pinion gear.

A further object of the present invention is to provide a sensor which will indicate when the tread mold segments have made contact with retreading material on the exterior of the casing. The sensor prevents the application of excessive force to the tire casing by the tread mold loading machine during installation of the tread mold on the casing. The sensor is one of the components which allows the tread mold loading machine to accommodate tire casings with significant variations in critical dimensions without damaging oversized casings.

BRIEF DESCRIPTION OF THE DRAWINGS

For a more complete understanding of the present invention, and the advantages thereof, reference is now made to the following description taken in conjunction with the accompanying drawings in which:

FIG. 5a is a drawing in section and in elevation illustrating a tread mold supporting arm used with the tread mold loading machine of FIG. 1, in its first position which releasably secures a mold segment thereto;

FIG. 5b is a drawing in section and in elevation illustrating the tread mold supporting arm of FIG. 5a in its second position which will release a mold segment therefrom.

DETAILED DESCRIPTION OF THE INVENTION

The preferred embodiments of the present invention and its advantages are best understood by referring to FIGS. 1 through 6 of the drawings, like numerals being used for like and corresponding parts of the various drawings.

Figure 1:
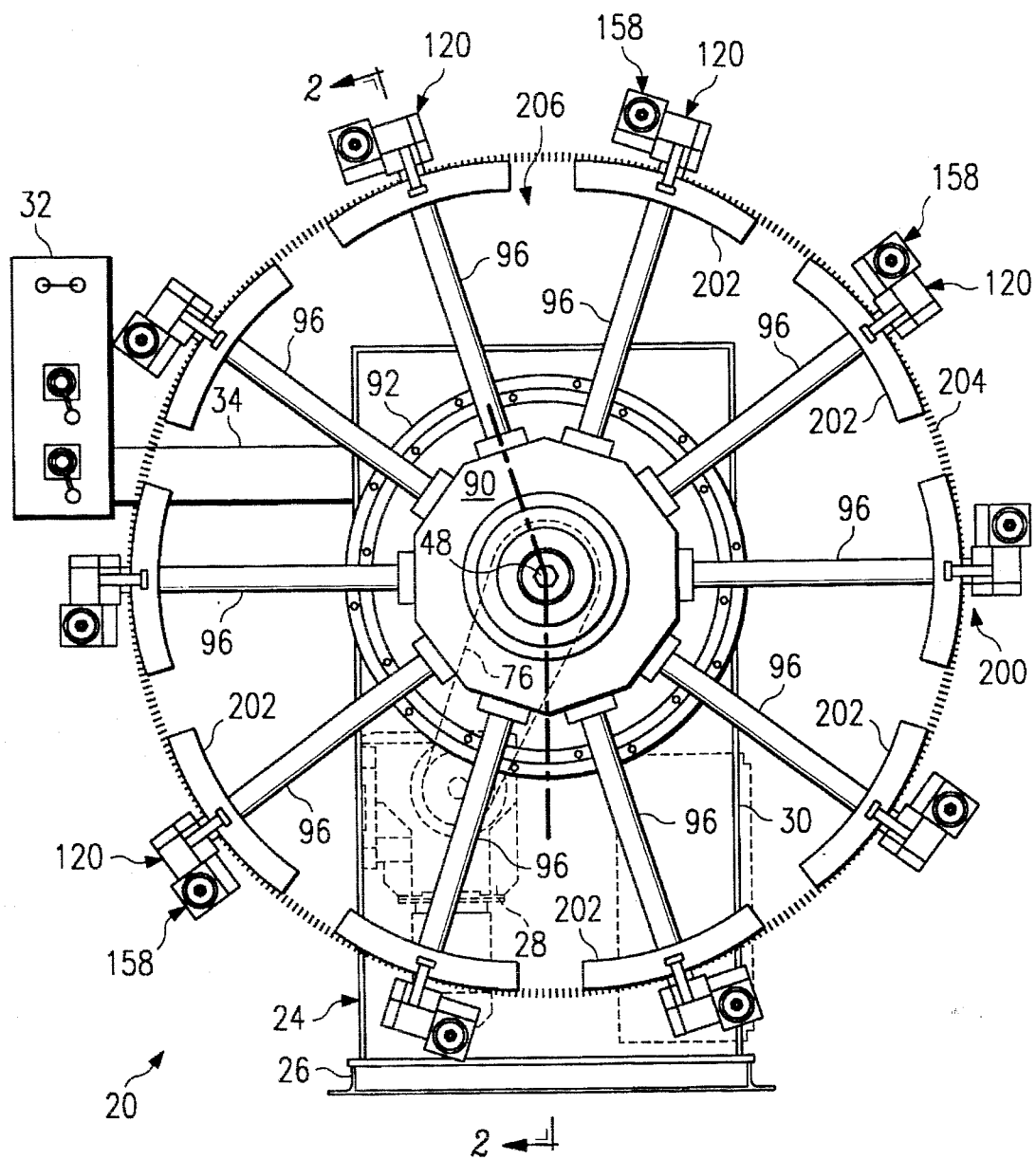
FIG. 1 is a schematic drawing in elevation with portions broken away showing a tread mold loading machine incorporating the present invention.
Figure 2:
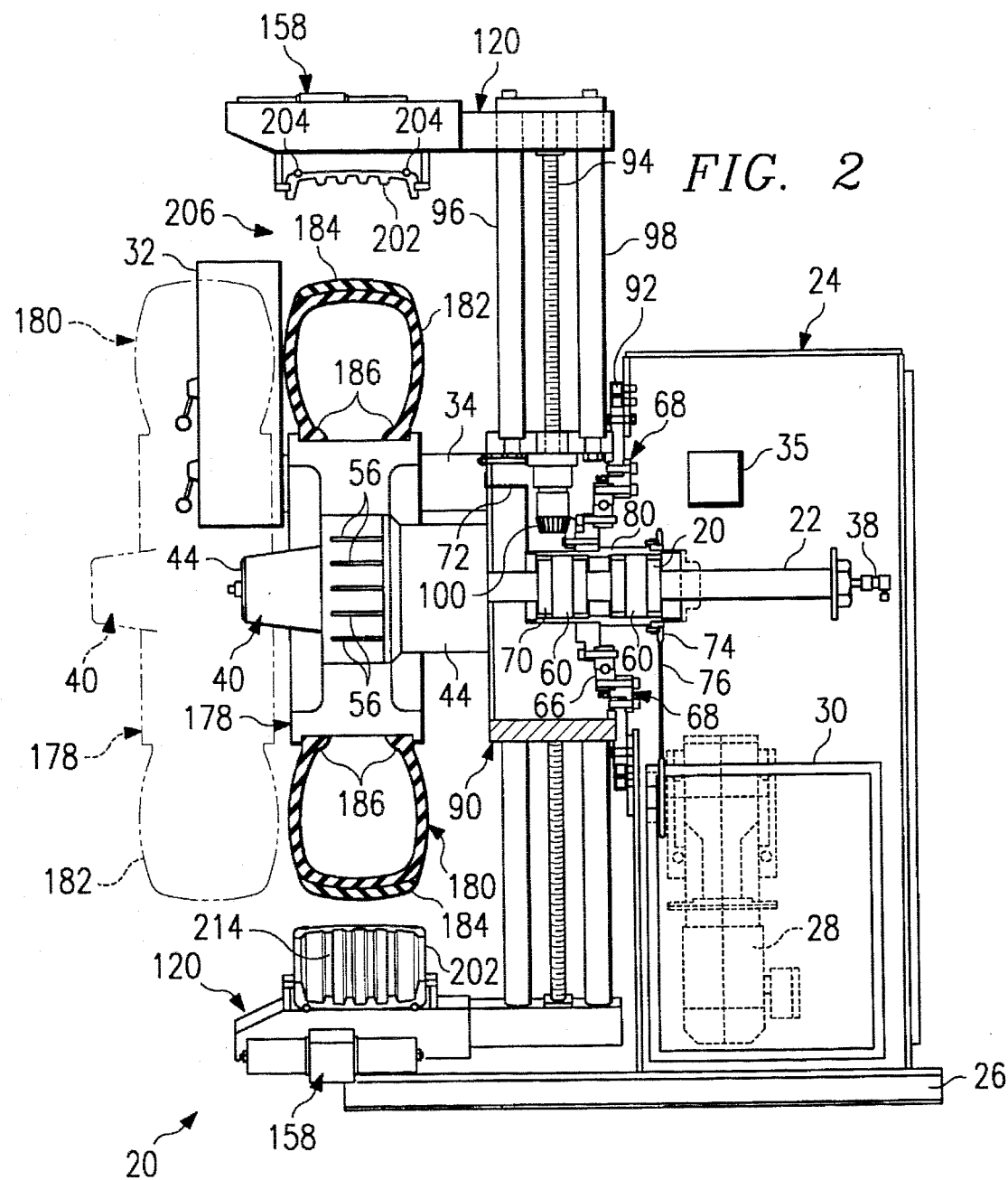
FIG. 2 is a schematic drawing in section and elevation with portions broken away, taken along line 2—2 of FIG. 1, showing a prepared tire carcass mounted on the tread mold loading machine of FIG. 1.

Tread mold loading machine 20, as best shown in FIGS. 1 and 2, is provided to install tread mold 200 on the exterior of prepared tire carcass or casing 180. For purposes of this patent application, prepared tire carcass or casing 180 refers to pneumatic tire carcass 182, which has been buffed to remove any old tread material (not shown), and a layer of adhesive or similar bonding agent (not shown) along with retreading material 184 applied to the exterior of carcass 182. Casing 180 may be prepared for retreading using conventional procedures and equipment prior to mounting casing 180 on tread mold loading machine 20.

Tread mold 200 is sometimes referred to as an adjustable mold because it will accommodate casings with variations in critical tire dimensions. The components which comprise tread mold 200 will be described later in more detail. These components include a plurality of mold segments 202 and one or more annular tension springs 204. Mold segments 202 are preferably spaced radially from main axle 22 prior to mounting casing 180 on main axle 22. As shown in FIG. 1, mold segments 202 are positioned by tread mold loading machine 20 to define expanded opening 206 to receive casing 180 therein.

As will be explained later in more detail, an important feature of tread mold loading machine 20 is the ability to move mold segments 202 radially with respect to main axle 22 and casing 180 when mounted thereon. Equally important features of tread mold loading machine 20 include the ability to move casing 180 longitudinally relative to tread mold 200 while mounted on main axle 22 and the ability to rotate casing 180 while mounted on main axle 22.

The various components and subassemblies which comprise tread mold loading machine 20 are secured to, supported by or contained within housing 24, which in turn is attached to and rests upon base 26. Components contained within housing 24 include prime mover or electrical motor 28 and electrical power supply box 30. Control panel 32 is attached to the side of housing 24 and extends outwardly therefrom. Control panel 32 is secured to one end of cable channel and supporting frame 34. The other end of cable channel and supporting frame 34 is secured to housing 24 at opening 35. Electrical cables and other conduits (not shown) may be disposed within cable channel and supporting frame 34 to extend from control panel 32 through opening 35 to the appropriate component contained within housing 24 or secured to housing 24. Cable channel and supporting frame 34 extends at a right angle relative to housing 24 to preferably position control panel 32 exterior from and adjacent to tread mold 200 when casing 180 is mounted on main axle 22.

The embodiment of tread mold loading machine 20 shown in FIGS. 1 and 2 is operated by a combination of electrical and pneumatic power. The various components and functions of tread mold loading machine 20 are controlled by a combination of electrical and/or pneumatic signals as appropriate. If desired, the electrical power functions and electrical control functions could be replaced by pneumatic and/or hydraulic power and control systems. In the same manner many of the components which are operated and controlled by pneumatic systems could be replaced by a hydraulic or electrical system with the exception of inflating casing 180. Since casing 180 is preferably inflated with air pressure while installing or loading tread mold 200 thereon, there are several practical benefits from using the available air supply for other functions and purposes within tread mold loading machine 20. However, for specific applications and designs, these pneumatically operated components could be replaced by hydraulic and/or electrically operated components as desired.

Several of the components and subassemblies which comprise tread mold loading machine 20 are secured to or supported by main axle 22. These components include expandable hub 40, a pair of rotary bearings 60, a pair of linear bearings 70, and hollow drive shaft 80. Rotary bearings 60 and linear bearings 70 are preferably disposed between the exterior of main axle 22 and the interior of hollow drive shaft 80. Head assembly 90 is secured to the front portion of housing 24 by annular plate 92 which is bolted to the front of housing 24. Annular plate 92 and the attached head assembly 90 are concentrically disposed around the exterior of main axle 22. Main axle 22 is supported within housing 24 by annular plate 92 and associated components.

As best shown in FIG. 1, ten sets of radial arms 94 and there associated guide rails 96 and 98 extend outwardly from head assembly 90. Head assembly 90 includes appropriate openings 86 and 88 which extending radially therethrough to secure one end of each set of guide rails respectively 96 and 98 thereto. Additional openings 84 are provided through head assembly 90 to allow the installation of each radial arm 94 between its associated guide rails 96 and 98. As will be explained later in more detail, radial arms 94 are disposed within head assembly 90 in a manner which allows rotation of radial arms 94 in unison with each other.

A plurality of tread mold supporting arms 120 are secured to their associated radial arm 94 and guide rails 96 and 98. Each radial arm 94 is used to position its associated mold supporting arm 120 with respect to casing 180 after casing 180 has been mounted on main axle 22. Since radial arms 94 are rotated in unison with respect to each other, mold supporting arms 120 also move in unison with respect to each other.

Figure 4:
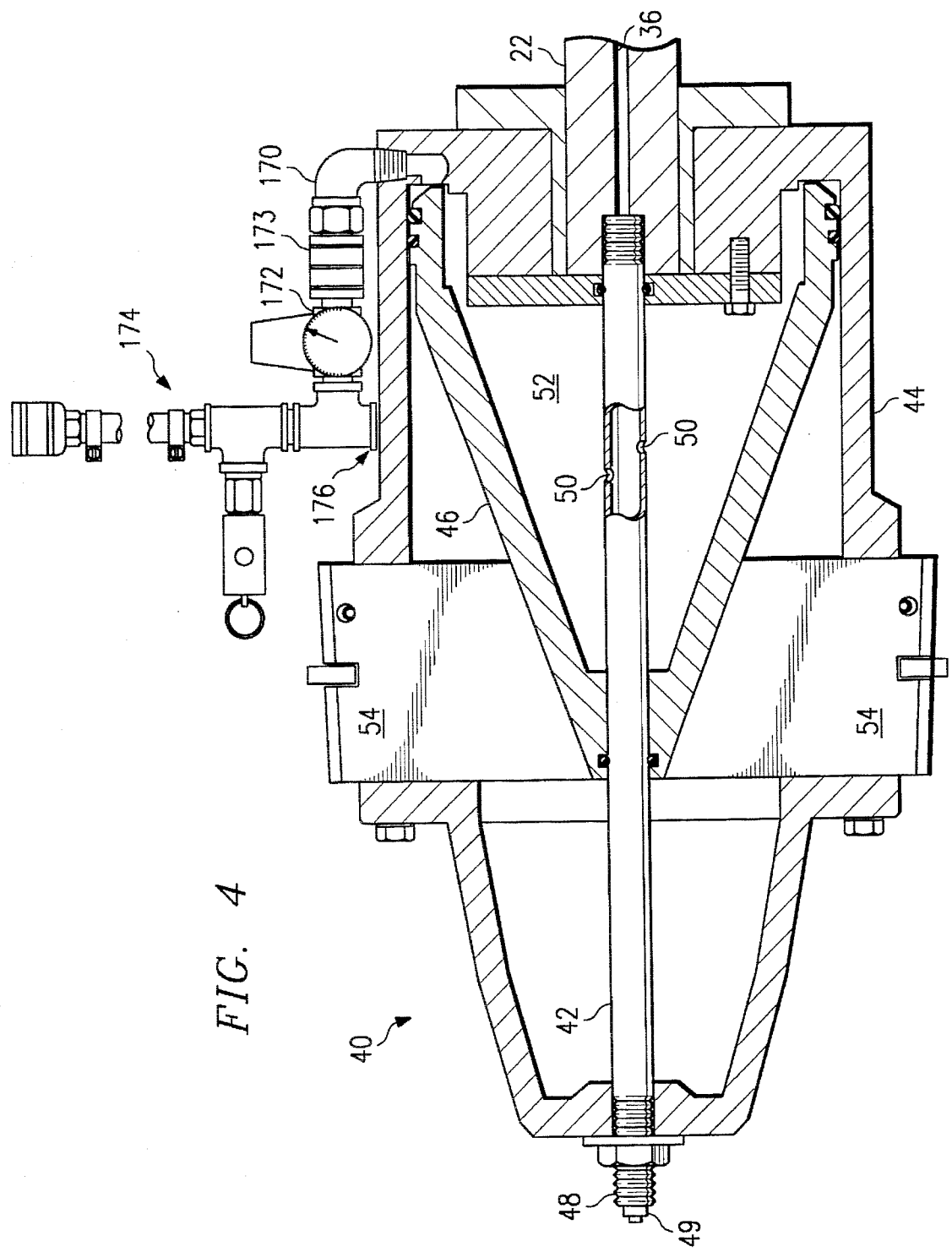
FIG. 4 is a drawing in section and in elevation with portions broken away showing an expandable hub which may be attached to the main axle of the tread mold loading machine of FIG. 1.

Expandable hub 40 is secured to the end of main axle 22 which extends through head assembly 90 and the front of housing 24. Expandable hub 40 provides a portion of the means for releasably mounting prepared tire carcass or casing 180 onto main axle 22. The various components and elements which comprise expandable hub 40 are disposed on the exterior of hollow pipe 42. As best shown in FIG. 4, main axle 22 preferably has a hollow bore 36 extending therethrough and communicating with hollow pipe 42. Air coupling 38 is provided on the end of main axle 22 contained within housing 24 and opposite from expandable hub 40. Expandable hub 40 includes housing 44 with tapered cone 46 slidably disposed therein. Housing 44 and tapered cone 46 are concentrically disposed on the exterior of hollow pipe 42. End 48 of pipe 42, which extends from housing 44, is preferably closed with pipe plug 49. One or more holes 50 are provided in pipe 42 to allow air to enter chamber 52 defined in part by tapered cone 46.

Tire rim 178 and casing 180 are mounted on expandable hub 40 prior to pressurizing chamber 52. If desired, tire rim 178 could be a single unit designed to form a seal with a specific size and type of tire casing. Preferably, tire rim 178 will be formed from multiple segments with an elastomeric band (not shown) surrounding the segments. By using a segmented tire rim 178 and enclosing the exterior of tire rim 178 with an elastomeric band, different sizes of tire casings may be satisfactorily mounted on main axle 22 by the use of expandable hub 40 and the same segmented rim 178.

By directing pneumatic (air) pressure through coupling 38, air will flow through longitudinal bore 36 and hollow pipe 42 into chamber 52 via holes 50. As the air pressure within chamber 52 increases, cone 46 will move towards the end of housing 44 and expand nylon inserts 54 through radial slots 56. As inserts 54 expand radially from housing 44, they will force the segments which comprise tire rim 178 and the associated elastomeric band outwardly to form a fluid tight seal with tire beads 186 provided on the inside diameter of casing 180.

Expandable hub 40 also includes a pair of hose connections 174 and 176. The air pressure flowing through longitudinal bore 36 into chamber 52 is typically 120 to 150 psig. Regulator 172 is provided in air line 170 to reduce this air pressure to approximately 20 psig at hose connection 174 and 176. Sliding valve 173 is provided to control the flow of air pressure to regulator 172. Tire rim 178 will preferably have two valve stems (not shown) to allow inflating casing 180 when mounted on expandable hub 40. Two hose connections 174 and 176 and two valve stems are provided to reduce the time required to inflate casing 180.

Figure 3:
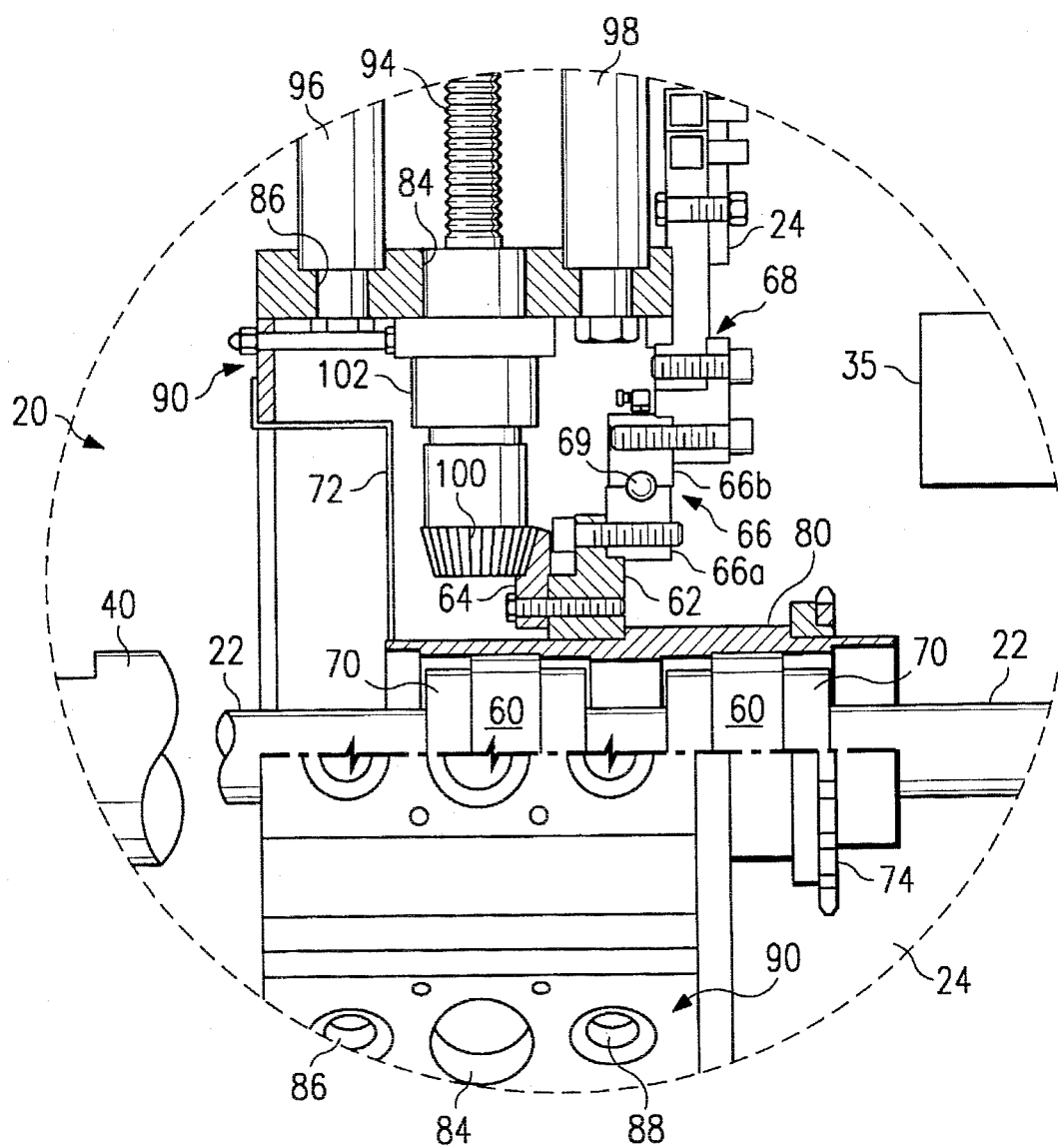
FIG. 3 is an enlarged fragmentary drawing in section and in elevation with portions broken away showing the bearings and gears associated with the main axle of the tread mold loading machine of FIG. 1.

Another important feature of the present invention, as best shown in FIGS. 2 and 3, is the cooperation between rotary bearings 60, linear bearings 70 and main axle 22 which allows longitudinal movement of expandable hub 40 relative to housing 24 and the other components which comprise tread mold loading machine 20. Rotary bearings 60 and linear bearings 70 allow expandable hub 40 to be moved longitudinally away from head assembly 90 and its associated mold supporting arms 120. The first position for expandable hub 40 and main axle 22, shown in FIG. 2 by dotted lines, facilitates mounting both tire rim 178 and casing 180 onto expandable hub 40.

Air pressure can be supplied to chamber 52 to expand inserts 54 radiating outwardly to releasably lock tire rim 178 to expandable hub 40. Hose connections 174 and 176 are used to inflate casing 180 to the desired pressure. When casing 180 has been inflated and releasably mounted on expandable hub 40, casing 180, expandable hub 40 and main axle 22 may be moved to their second position in which casing 180 is radially adjacent to mold supporting arms 120 and tread mold 200.

Tread mold 200 is installed or loaded onto retreading material 184 when casing 180 is in its second position. As will be explained later in more detail, after tread mold segments 202 have been released from their respective mold supporting arms 120, expandable hub 40 along with rim 178 and casing 180 may be returned to their first position. In this first position, casing 180 may be deflated along with releasing the pneumatic pressure in chamber 52 which holds segmented rim 178 radially expanded. With casing 180 and expandable hub 40 depressurized, casing 180 with tread mold 200 loaded thereon may be removed from tread loading machine 20. A new casing may then be placed on tire rim 178 and new mold segments loaded onto tread mold supporting arms 120 to repeat the process of installing another tread mold 200 onto another casing 180.

As best shown in FIG. 3, a pair of rotary bearings 60 and a pair of linear bearings 70 are disposed between the exterior of main axle 22 and the interior of hollow drive shaft 80. Linear bearings satisfactory for use with the present invention may be obtained from Boston Gear, a Division of Rockwell International. Rotary bearings satisfactory for use with the present invention may be obtained from INA/Torrington.

Annular collar 62 is disposed on the exterior of hollow drive shaft 80 intermediate the ends thereof. Annular gear 64 is secured to one side of annular collar 62. Annular bearing 66 is secured to the opposite side of annular collar 62 and provides a portion of the means for positioning hollow drive shaft 80 and main axle 22 within housing 24. Annular bearing 66 may be a Rotek Series 3000 bearing available from the Hoesch Group.

One portion 66a of annular bearing 66 is secured to collar 62. The other portion 66b of annular bearing 66 is secured to housing 24 via couplings 68. A plurality of balls 69 are disposed between annular bearing races or portions 66a and 66b. Annular collar 62 cooperates with annular bearing 66 and couplings 68 to allow rotation of hollow drive shaft 80 relative to housing 24. Rotary bearings 60 contained within hollow drive shaft 80 allow rotation of main axle 22 and/or hollow drive shaft 80 relative to each other.

Dust cover 72 is installed on the front of head assembly 90 to protect the bearings and gears associated with main axle 22 and hollow drive shaft 80 from contamination and debris.

Pinion gears 100 are secured to the end of each radial arm 94 which extends into head assembly 90. Flange and bearing assembly 102 is used to secure each radial arm 94 within its respective opening 84 in head assembly 90 and to position each pinion gear 100 adjacent to and contacting annular gear 64. By disposing each pinion gear 100 in contact with annular gear 64, rotation of hollow drive shaft 80 will be translated into rotation of each radial arm 94. Thus, rotation of hollow drive shaft 80 in a clockwise direction is translated into clockwise rotation of radial arms 94. In a similar manner, rotation of hollow drive shaft 80 in a counterclockwise direction will result in counterclockwise rotation of radial arms 94. An important feature of the present invention is that rotation of hollow drive shaft 80 results in rotation of each radial arm 94 in unison with the other radial arms 94.

Sprocket gear 74 is mounted on the exterior of hollow drive shaft 80 spaced longitudinally from flange 62. Drive chain 76 connects sprocket gear 74 with electrical motor 28. Appropriate control signals are transmitted from control panel 32 to electrical motor 28 to cause either clockwise or counterclockwise rotation of hollow drive shaft 80 via drive chain 76 and sprocket gear 74. If desired for specific applications, electrical motor 28 could be replaced with other types of prime movers such as a hydraulic motor or a pneumatic motor.

Each mold supporting arm 120 is engaged with its associated radial arm 94. Mold supporting arms 120 include openings 124, 126 and 128 extending radially therethrough. Opening 126 includes hollow bushing 136 to allow mold supporting arms 120 to slide over the exterior of their respective guide rail 96. In the same manner opening 128 includes hollow bushing 138 which allows mold supporting arms 120 to slide over the exterior of their respective guide rail 98. Threaded bushing 134 is preferably installed into each opening 124 and secured therein by flange 130. Bolts 132 may be used to secure flange 130 and bushing 134 into each opening 124. The interior of bushing 134 contains threads 131 which match threads 102 on the exterior of radial arms 94. Thus, rotation of radial arms 94 by hollow drive shaft 80 is translated by matching threads 102 and 131 into radial movement of mold supporting arms 120, either inwardly or outwardly with respect to main axle 22 and casing 180 when mounted thereon. If desired for selected applications, radial arms 94 could be replaced by a plurality of hydraulic cylinders (not shown) to move mold supporting arms 120 radially inward and outward.

Each mold supporting arm 120 includes housing 122 with clamp assembly 140 partially contained therein. The principal elements of clamp assembly 140 includes a pair of fingers 142 and 144 which extend from housing 122. In FIGS. 5a and 5b, housing 122 is shown with cover 121 removed to better illustrate the components which comprise clamp assembly 140.

Fingers 142 and 144 are securely engaged with their associated racks 152 and 154. Pinion gear 146 is disposed within housing 122 between racks 152 and 154. Matching teeth 148 are provided on the exterior of pinion gear 146 to engage similar teeth 148 on each rack 152 and 154. Thus, by rotation of pinion gear 146, racks 152 and 154 are moved longitudinally with respect to each other. For the embodiment of the present invention shown in FIGS. 5a and 5b, rotation of pinion gear 146 in one direction causes racks 152 and 154 to move their associated fingers 142 and 144 longitudinally towards each other. In the same respect, rotation of pinion gear 146 in the other direction causes movement of fingers 142 and 144 longitudinally away from each other. Such movements are used to engage and disengage each clamp assembly 140 from its associated mold segment 202. Slots 162 and 164 are provided within housing 122 to assist and guide movement of racks 152 and 154 respectively with their associated fingers 142 and 144. If desired, pinion gear 146 and racks 152 and 154 could be replaced by hydraulic cylinders (not shown) to move fingers 142 and 144 with respect to each other.

Rack 152 is similar to rack 154 except end 156 of rack 152 opposite from finger 142 is formed in an arc which defines a radius of curvature matching the radius of curvature of pinion gear 146. Slot 162 contains a longitudinal portion 168 and a portion extending radially therefrom 166. Radial portion 166 of slot 162 cooperates with radial portion or end 156 of rack 152 to allow finger 142 to move both longitudinally and to pivot with respect to pinion gear 146. Thus, pinion gear 146 and racks 152 and 154 are able to move fingers 142 and 144 longitudinally towards and away from each other in addition to pivoting finger 142 away from finger 144. Pivoting finger 142 to its second position shown in FIG. 5b facilitates installation and removal of the associated mold segment 202 which may be releasably secured between fingers 142 and 144.

Heads 143 and 145 are provided respectfully on the end of each finger 142 and 144 extending from housing 122. Heads 143 and 145 have a generally rectangular cross-section which may be inserted into appropriately sized openings (not shown) in the side of each mold segment 202. Another important feature of the present invention is that various types of mold segments may be used with tread mold loading machine 20 by either simply replacing the head on fingers 142 and 144 to match holes in the new mold segments or providing a matching hole in the side of the new mold segments for the existing heads 143 and 145.

Figure 6:
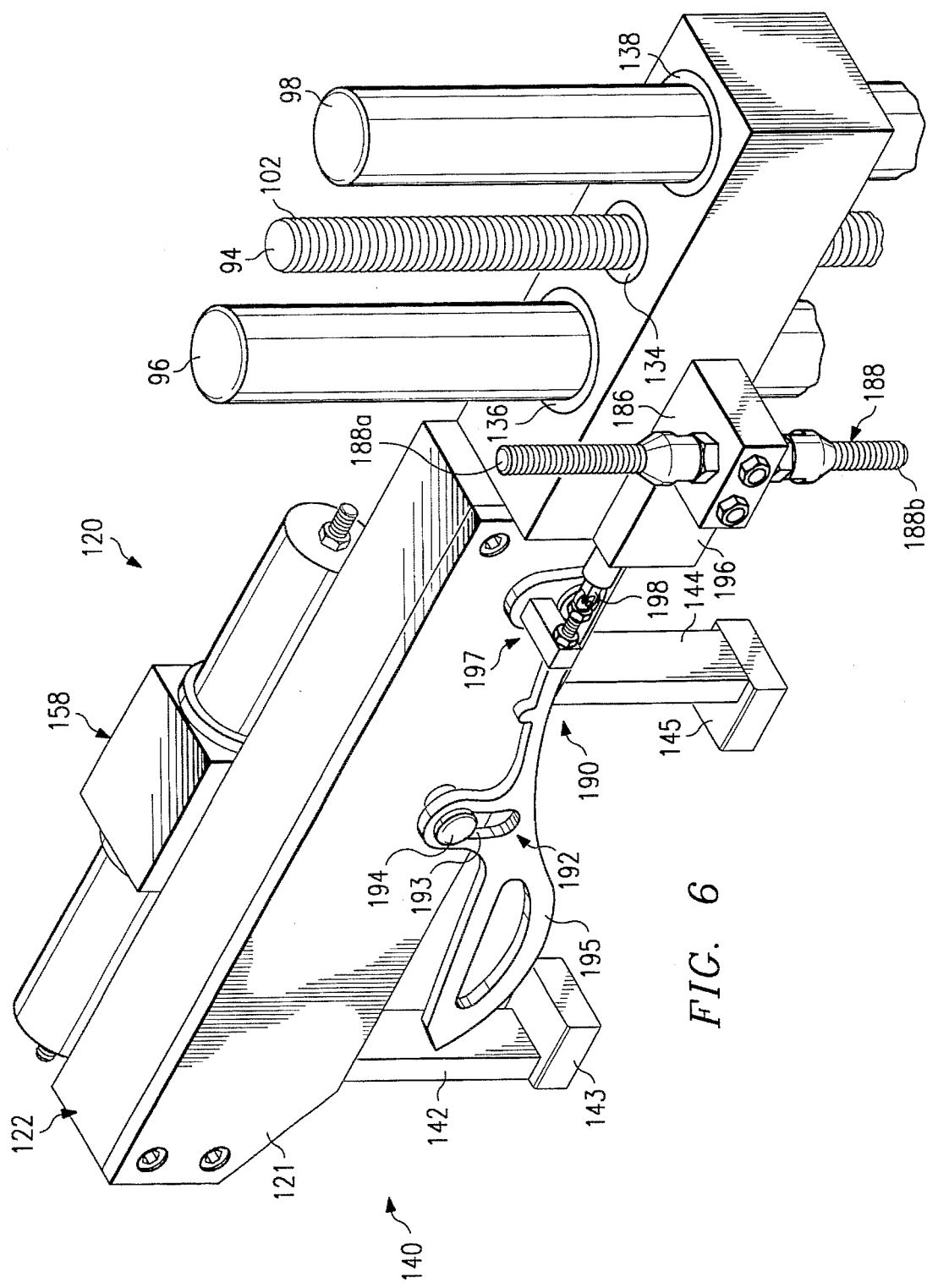
FIG. 6 is an isometric drawing of the tread mold supporting arm of FIG. 5a and 5b engaged with its associated radial arm and guide rails.

As best shown in FIGS. 1 and 6, actuators 158 are positioned on the exterior of each housing 122. Shaft 160 extends from actuator 158 into housing 122. Pinion gear 146 is secured to shaft 160 by key 170. Therefore, when shaft 160 is rotated by actuator 158, pinion gear 146 will rotate and move fingers 142 and 144 either towards each other or away from each other depending upon the direction of rotation of pinion gear 146. Actuator 158 as shown in FIG. 6 is air operated. As previously noted, various components of tread mold loading machine 20 may be either air operated, electrically operated or hydraulically operated. Actuator 158 is an example of an air operated component which could be replaced by an electric motor or a hydraulic motor.

At least one mold supporting arm 120 will preferably include sensor assembly 190 to indicate when the associated mold segment 202 has contacted retreading material 184. As shown in FIG. 6, sensor 190 includes lever 192 mounted on the exterior of housing 122 by slot 193 and pivot pin 194. Slot 193 and pivot pin 194 cooperate to allow limited radial movement and pivoting movement of lever 192 relative to housing 122. End 195 of lever 192 is enlarged for contact with the top portion of tread mold segment 202 associated with the selected mold supporting arm 120 carrying sensor 190.

Limit switch 196 is secured to support arm 120 as part of sensor 190. The other end 197 of lever 192 is positioned adjacent to limit switch 196. In FIG. 6, lever 192 is shown in its first position which would allow end 195 to contact the top portion of an associated mold segment 202 when installed between fingers 142 and 144. In this first position, end 197 of lever 192 engages limit switch 196 to allow rotation of radial arms 94 and corresponding inward movement of all mold supporting arms 120.

When the selected mold segment 202 associated with sensor 190 contacts retreading material 184, the selected mold segment 202 will move upwardly forcing end 195 to move upwardly with respect to pivot pin 194 and rotate end 197 to release limit switch 196. When disengagement between end 197 and limit switch 196 occurs, prime mover or electrical motor 28 will be prevented from further rotation of radial arms 94 to move mold supporting arms 120 inwardly towards casing 180. Sensor 190 thus prevents placing undesired forces on casing 180 if radially inward movement of mold supporting arms 120 continued after mold segments 202 contacted retreading material 184.

Sensor 190 shown in FIG. 6 includes lever 192 and limit switch 196. For some applications limit switch 196 could be mounted directly to housing 122 with plunger 198 positioned above the associated mold segment 202. In this alternative configuration, when the associated mold segment 202 moves upward towards housing 122, it would contact plunger 198 and activate limit switch 196. If desired, more than one mold supporting arm 120 may carry a sensor assembly 190.

Bracket 186 with rod 188 extending therethrough is also attached to the side of at least one mold supporting arm 120. Rod 188 is used to trip additional limit switches (not shown) which define the maximum amount of radial travel for mold supporting arms 120 both inwardly and outwardly with respect to main axle 22. When the selected mold supporting arm 120 has reached the outermost limit of its desired travel, rod segment 188a will contact the upper limit switch. When the selected mold supporting arm 120 has reached its maximum desired radial travel inwardly towards main axle 22, rod segment 188b will activate the inner limit switch. If desired, more than one mold supporting arm 120 may carry rod 188.

FIGS. 1 and 2 show the use of tension springs 204 disposed in grooves on the exterior of mold segments 202. If desired, an elastomeric tension band could also be provided on the exterior of the mold segments 202 between tension springs 204. A tension band is not shown in FIGS. 1 and 2 to allow better illustration of the other components which comprise tread loading machine 20 and tread mold 200. A segmented tread mold with tension springs and an elastomeric band are shown in more detail in co-pending patent application Ser. No. 07/908,228, filed Jul. 2, 1992.

As illustrated in FIG. 1, tread mold 200 is formed of a plurality of segments 202. Ten segments are illustrated, but any number of mold segments can be used as required for the specific tread mold loading machine and the specific tread mold design. Between each of the mold segments, alignment pins (not shown) and alignment receptacles (not shown) may be provided so that the ends of mold segments 202 will align when installed on casing 180 to assure that tread mold 200 is circular in configuration.

The fragmentary view of mold segment 202 in FIG. 2 illustrates more clearly the arrangement of tension springs 204 in mold segments 202. As previously noted, an elastomeric tension band could also be located between tension springs 204 in an annular groove (not shown).

In a process utilizing the apparatus of the invention, tire carcass 182 is prepared to receive retreading material 184. After proper preparation, the layer of retreading material 184 is applied to the outer circumference of casing 180 as shown in FIG. 2 with or without a bonding agent therebetween. After mounting casing 180 on expandable hub 40 and moving expandable hub 40 to its second position, mold segments 202 of tread mold 200 are placed over retreading material 184 with tread pattern 214 engaging the outer surface of retreading material 184.

After assembly of casing 180 and tread mold 200 as described above, a pressure envelope (not shown) is stretched over the assembled tread mold 200 and pressurized to provide the final force for driving tread pattern 214 into the outer surface of retreading material 184. The final assembly including casing 180, tread mold 200 and envelope are then placed in a hot air chamber (not shown) until retreading material 184 is properly cured.

From the foregoing description, it will be appreciated that the apparatus and methods of the present invention, permit retreading of tires without the necessity of distorting the tire carcass or requiring the use of expensive mold stretchers. The operation of loading or installing a tread mold on a prepared tire carcass can be performed simply and quickly to efficiently retread tires.

Although the present invention and its advantages have been described in detail, it should be understood that various changes, substitutions and alterations can be made therein without departing from the spirit and scope of the invention as defined in the following claims.

What is claimed is:

1. A method for installing an adjustable tread mold having a plurality of mold segments on a prepared tire carcass having a strip of retread material disposed on the exterior of the tire carcass, including the steps of:

placing resilient retaining means on the mold segments to urge the mold segments toward the tire carcass;

releasably securing the plurality of mold segments to a tread mold loading machine;

positioning the plurality of mold segments on the tread mold loading machine to define in part an expanded opening to receive the tire carcass therein;

mounting the tire carcass on the tread mold loading machine;

positioning the tire carcass within the expanded opening defined in part by the mold segments;

moving the mold segments to contact the retreading material on the exterior of the tire carcass;

releasing the mold segments from the tread loading machine after engagement with the retreading material;

maintaining the mold segments on the retreading material with the resilient retaining means; and removing the tire carcass from the tread mold loading machine with the tread mold engaged with the retreading material.

2. The method of claim 1 wherein the step of positioning the mold segments further comprises the step of releasably securing the mold segments to a plurality of mold supporting arms provided by the tread mold loading machine.

3. The method of claim 1 wherein the step of mounting the tire carcass on the tread mold loading machine further comprises the step of:

installing a tire rim on an expandable hub engaged with a main axle which extends longitudinally through the tread mold loading machine;

positioning the tire rim and the expandable hub outside the expanded opening defined in part by the mold segments;

mounting the tire carcass on the tire rim; and positioning the tire carcass, the tire rim and the expandable hub within the expanded opening defined in part by the mold segments.

4. The method of claim 3 wherein the step of mounting the tire carcass on the tire rim further comprises the steps of:

installing a segmented tire rim on the expandable hub;

placing an elastomeric band on the exterior of the tire rim; and mounting the tire carcass on the tire rim whereby the tire carcass will contact the elastomeric band to form a pressure seal therewith.

5. A method for installing a tread mold having a plurality of mold segments on a prepared tire carcass with a strip of retread material disposed on the exterior of the tire carcass, comprising the steps of:

placing a resilient retainer on the mold segments to urge the mold segments toward the retreading material;

releasably securing the mold segments to a plurality of respective mold supporting arms provided by a tread mold loading machine;

positioning the plurality of mold segments with the mold supporting arms to define in part an expanded opening on the tread mold loading machine to receive the tire carcass therein;

mounting the tire carcass on the tread mold loading machine;

positioning the tire carcass within the expanded opening defined in part by the mold segments;

moving the mold segments with the mold supporting arm to contact the retreading material on the exterior of the tire carcass;

releasing the mold segments from the mold supporting arms after engagement with the retreading material;

maintaining the mold segments on the retreading material with the resilient retainer; removing the tire carcass from the tread mold loading machine with the tread mold engaged with the retreading material; and the step of releasably securing the mold segments further comprising the step of engaging a clamp carried by each mold supporting arm with one of the respective mold segments.

6. The method of claim 5 wherein the step of releasing the mold segments further comprises the step of activating each mold supporting arm to disengage the respective clamp from the respective mold segment.

7. A method for installing an adjustable tread mold having a plurality of mold segments on a prepared tire carcass having a strip of retread material disposed on the exterior of the tire carcass, including the steps of:

placing a tension spring on an exterior surface of each mold segment to urge the mold segments toward the tire carcass;

releasably securing the plurality of mold segments to a tread mold loading machine;

moving the plurality of mold segments radially outward on the tread mold loading machine to define in part an expanded opening to receive the tire carcass therein;

positioning the tire carcass within the expanded opening defined in part by the mold segments;

moving the mold segments radially inward to contact the retreading material on the exterior of the tire carcass;

releasing the mold segments from the tread mold loading machine after engagement with the retreading material;

removing the tire carcass from the tread mold loading machine with the tread mold engaged with the retreading material;

maintaining the mold segments on the tire carcass with the tension spring;

the step of moving the mold segments to contact the retreading material further comprising the steps of:

moving the mold segments radially inward until the mold segments contact the retreading material;

providing a sensor on at least one of the mold segments to indicate that the mold segment with the sensor has contacted the retreading material; and stopping movement of the mold segments in response to a signal from the sensor.

8. A method for installing an adjustable tread mold having a plurality of mold segments on a prepared tire carcass with a strip of retreading material disposed on the exterior of the tire carcass, including the steps of:

forming a tread pattern on an interior surface of each mold segment;

placing a tension spring on an exterior surface of each mold segment to urge the tread pattern of the mold segments toward the tire carcass;

releasably securing the plurality of mold segments to a tread mold loading machine;

moving the plurality of mold segments radially outward on the tread mold loading machine to define in part an expanded opening to receive the tire carcass therein;

positioning the tire carcass within the expanded opening defined in part by the mold segments;

moving the mold segments radially inward to place the tread pattern in contact with the retreading material on the exterior of the tire carcass;

releasing the mold segments from the tread mold loading machine after engagement with the retreading material;

removing the tire carcass from the tread mold loading machine with the tread mold engaged with the retreading material; and placing a pressure envelope over the tread mold and tire carcass for use in providing a force for driving the tread pattern of the mold segments into the retreading material.

* * * * *